US005849848A

United States Patent [19]

Kosaka et al.

[11] Patent Number: 5,849,848

[45] Date of Patent: Dec. 15, 1998

[54] TONER RESIN COMPOSITION AND A METHOD OF MANUFACTURING IT AS WELL AS A TONER AND A METHOD OF MANUFACTURING IT

[75] Inventors: Yoshiyuki Kosaka, Shiga-ken; Takashi Ueyama, Kusatsu; Tatsuo Suzuki, Shiga-ken, all of Japan

[73] Assignee: Sekisui Chemical Co., Ltd., Osaka, Japan

[21] Appl. No.: 733,176

[22] Filed: Oct. 17, 1996

Related U.S. Application Data

[63] Continuation-in-part of Ser. No. 345,428, Nov. 21, 1994, abandoned.

[30] Foreign Application Priority Data

May 24, 1994 [JP] Japan .................................... 6-109890

[51] Int. Cl.$^{6}$ ...................................................... C08L 33/02

[52] U.S. Cl. ............................................ 525/221; 525/241

[58] Field of Search ..................................... 525/221, 241

[56] References Cited

U.S. PATENT DOCUMENTS

| | | | |
|---|---|---|---|
| 3,475,516 | 10/1969 | Bauer et al. | 525/80 |
| 3,830,878 | 8/1974 | Kato et al. | 525/80 |
| 3,965,021 | 6/1976 | Clemens et al. | 525/94 |
| 4,086,296 | 4/1978 | Carty et al. | 525/66 |
| 5,116,910 | 5/1992 | Tone et al. | 525/244 |
| 5,317,060 | 5/1994 | Kukimoto et al. | 525/197 |

*Primary Examiner*—Margaret W. Glass
*Attorney, Agent, or Firm*—Townsend & Banta

[57] ABSTRACT

A toner resin composition and toner is provided, wherein said toner resin composition comprises a high molecular weight resin having a peak molecular weight of about 100,000–4,000,000, or a gel content of about 20% or more is blended with another resin comprising at least a low molecular weight component (having a peak molecular weight of about 3,000–50,000, making up about 60–95 wt % of the resin weight) and a high molecular weight component (having a peak molecular weight of about 100,000–4,000,000, making up about 5–40 wt % of another resin weight).

2 Claims, No Drawings

TONER RESIN COMPOSITION AND A METHOD OF MANUFACTURING IT AS WELL AS A TONER AND A METHOD OF MANUFACTURING IT

CROSS REFERENCE TO A RELATED APPLICATION

This is a Continuation-in-part patent application of application Ser. No. 08/345,428 filed Nov. 21 1994, now abandoned. U.S. Pat. No. 08/503,804 (now 5,658,991) is an F.W.C. of 08/345,428.

FIELD OF THE INVENTION

The present invention relates on general to a toner resin composition and toner used in electrophotography and more particularly to a toner resin composition used in the dry developing method of the electrostatic charge image development method and a method of manufacturing it, as well as a toner which contains the toner resin composition and a method of manufacturing it.

BACKGROUND OF THE INVENTION

The dry developing method is widely used to develop electrostatic charge images in electrophotography and such. In the dry developing method, toner which contains dispersed coloring agents such as carbon black is used.

Toner is a fine powder developing agent capable of frictional electrification. Toner is electrified by friction and, because of electrical attraction, adheres to electrostatic latent images on the photosensitive matter to form toner images. The toner images thus formed are then transferred onto paper and fixed with a heating roller(s).

Toner is required to have anti-offset properties (that is, the toner does not stick to the heating roller(s)), fixability (the toner adheres firmly to the paper), anti-blocking properties (the toner particles do not aggregate), etc. For the purpose of improving the anti-offset properties, toners containing toner resin compositions which were given a wider molecular weight distribution by using a low molecular weight component(s) and a high molecular weight component(s) were proposed in Japanese unexamined patent publication (Tokkai) Sho 50-134652, Tokkai Sho 56-16144 and Tokkai Sho 56-158340. However, the resin composition having a wide molecular weight distribution simply by using a low molecular weight component(s) and a high molecular weight component(s) does not quite acquire sufficient anti-offset properties. Blends of thermoplastic polymers with a multiphase acrylic composite polymer are disclosed in U.S. Pat. No. 4,086,296. The multiphase acrylic polymer comprises a "seed" or "core" of a first non-crosslinked soft phase of a molecular weight of 7,500–50,000 of an alkyl acrylate which may optionally contain another acrylic monomer and another copolymerizable ethylenically unsaturated monomer. A final coating or shell is then formed on the seed or core by polymerizing in the presence of the soft phase a second monomer emulsion or solution comprising at least one monomer which is methacrylate, acrylate, styrene or substituted styrene, and optionally another acrylic monomer and another copolymerizable ethylenically unsaturated monomer, wherein the resulting coating or shell has a molecular weight of from about 400,000 to about $5*10^6$. In this sequential polymerization, the monomers forming the coating or shell chemically react with reactive sites on the seed or core polymer since the seed or core polymer is not cross-linked before the final coating or shell is applied thereto. The resulting multiphase polymer is unsuitable for use as a toner resin since a toner resin must be homogeneous to provide a uniform coating on a substrate.

The object of the present invention is to provide an improved toner resin composition and a toner containing same, wherein said toner resin composition is easy to manufacture, has improved anti-offset properties as well as superior anti-blocking properties and fixability, and also has stable electrification characteristics.

SUMMARY OF THE INVENTION

It has been discovered that a toner resin composition with superior anti-offset properties as well as good fixability and anti-blocking properties can be obtained by a process in which a high molecular weight resin with a peak molecular weight of about 100,000–4,000,000, or a gel content of 20% or more, is dry-blended or melt-blended into a resin comprising a low molecular weight component(s) and a high molecular weight component(s) with prescribed peak molecular weight values.

In the present invention the toner resin composition comprises a high molecular weight resin with a peak molecular weight of about 100,000–4,000,000, or a gel content of 20% or more, which is dry-blended or melt-blended into a resin comprising at least a low molecular weight component (having a peak molecular weight of about 3,000–50,000, making up about 60–95 wt % of the resin weight) and a high molecular weight component (having a peak molecular weight of about 100,000–4,000,000, making up about 5–40 wt % of the resin weight).

The present invention also provides a method of manufacturing a toner resin composition comprising solution polymerizing a resin comprising at least a low molecular weight component (having a peak molecular weight of about 3,000–50,000, making up about 60–95 wt % of the resin weight) and a high molecular weight component (having a peak molecular weight of about 100,000–4,000,000, making up about 5–40 wt % of the resin weight), and then dry-blending or melt-blending therewith a high molecular weight resin having a peak molecular weight of about 100,000–4,000,000, or a gel content of about 20% or more.

Furthermore, the present invention includes a toner which characteristically contains a coloring agent(s) and a toner resin composition obtained by dry-blending or melt-blending a high molecular weight resin having a peak molecular weight of about 100,000–4,000,000 or a gel content of about 20% or more into a resin comprising at least a low molecular weight component (having a peak molecular weight of about 3,000–50,000, making up about 60–95 wt % of the resin weight) and a high molecular weight component (having a peak molecular weight of about 100,000–4,000,000, making up about 5–40 wt % of the resin weight).

The present invention also includes a method of manufacturing toner wherein coloring agent(s) is mixed with a toner resin composition obtained by dry-blending or melt-blending a high molecular weight resin having a peak molecular weight of about 100,000–4,000,000, or a gel content of 20% or more into a resin comprising at least a low molecular weight component (having a peak molecular weight of about 3,000–50,000, making up about 60–95 wt % of the resin weight) and a high molecular weight component (with a peak molecular weight of 100,000–4,000,000, making up 5–40 wt % of the resin weight).

Furthermore, the present invention includes a method of manufacturing toner wherein a resin comprising at least a low molecular weight component (having a peak molecular weight of about 3,000–50,000, making up about 60–95 wt % of the resin weight) and a high molecular weight component (having a peak molecular weight of about 100,000–4,000,000, making up about 5–40 wt % of the resin weight) is mixed with a coloring agent(s), and, along with the coloring agent or after mixing the coloring agent, a high molecular weight resin with a peak molecular weight of about 100,000–4,000,000, or a gel content of about 20% or more is mixed therewith.

DETAILED DESCRIPTION OF THE INVENTION

The toner resin composition of the present invention comprises a resin composition obtained by dry-blending or melt-blending a first resin comprising high molecular weight component resin into a second resin comprising a homogeneous single phase polymer mixture of at least a low molecular weight component and a high molecular weight component obtained by solution polymerization.

A second resin comprising a homogeneous single phase polymer mixture of at least a low molecular weight component and a high molecular weight component is a polydisperse polymer which has, in its molecular weight distribution curve, a peak(s) of a low molecular weight component(s) in the low molecular weight region and a peak(s) of a high molecular weight component(s) in the high molecular weight region. The peak molecular weight of the low molecular weight component is from about 3,000 to 50,000, and the peak molecular weight of the high molecular weight component is from about 100,000 to 4,000,000.

As for the weight ratio between the low molecular weight component and the high molecular weight component, the low molecular weight component with a peak molecular weight of about 3,000–50,000 makes up about 60–95 wt % and the high molecular weight component having a peak molecular weight of about 100,000–4,000,000 makes up about 5–40 wt %. It is not preferable to have more than about 95 wt % of the low molecular weight component because then melt-blending with the high molecular weight component resin will be difficult and compatibility and dispersibility will be poor. It is not preferable to have more than about 40 wt % of the high molecular weight component because then separation from the organic solvent will be difficult, and a large amount of the organic solvent will remain after the solvent removal process, which is the last stage of the resin manufacturing method.

The second resin comprising the low molecular weight component(s) and the high molecular weight component(s) can be obtained by, for example, preparing the low molecular weight component by means of solution polymerization, preparing the high molecular weight component by means of solution polymerization, suspension polymerization or bulk polymerization, and mixing the obtained low molecular weight component and the high molecular weight component in solution form.

The low molecular weight component can also be polymerized by means of solution polymerization in the presence of the high molecular weight component. Cross-linking may also be effected in the solution polymerization of the low molecular weight component. For example, the high molecular weight component, i.e. a resin with a peak molecular weight of about 100,000–4,000,000, may be dissolved in the polymerization solution and then the monomers which are to constitute the low molecular weight component may be polymerized in this solution to complete preparation. Carrying out this manufacturing method with the suspension polymerization method is not preferable, because then the residual concentration of the polymerization starter would become high.

Examples of the organic solvent used in the solution polymerization are hexane, heptane, toluene and xylene. Of these, toluene and xylene are more preferable.

The toner resin composition of the present invention is obtained by blending a high molecular weight first resin having a peak molecular weight of about 100,000–4,000,000 into the second resin comprising the low molecular weight component and the high molecular weight component obtained as described above. The molecular weight range of the first high molecular weight resin to be blended is preferably from about 200,000 to 3,000,000, and more preferably from about 500,000 to 2,000,000. A high molecular weight resin with a gel content of about 20% or more may be blended instead of the high molecular weight resin with said peak molecular weight.

It is preferable to blend a high molecular weight resin having a peak molecular weight of about 100,000–4,000,000, and a gel content of about 20% or more. More preferable is a high molecular weight resin with a peak molecular weight of about 200,000–3,000,000, and a gel content of about 20% or more. The most preferable is a high molecular weight resin having a peak molecular weight of about 500,000–2,000,000, and a gel content of about 20% or more.

As for the blending method, blending can be effected by a dry-blender at a ratio according to the offset temperature required of the toner, or by a method using a melter for melt-blending.

For the ratio between the second resin comprising the low molecular weight component and the high molecular weight component as described above, and the first high molecular weight component resin to be blended, it is preferable for the second resin comprising the low molecular weight component and the high molecular weight component to make up about 40–95 wt % and the high molecular weight component resin to be blended to make up about 5–60 wt %. If the resin comprising the low molecular weight component and the high molecular weight component is more than about 95 wt %, then the anti-offset effect will be reduced. If the high molecular weight component resin is more than about 60 wt %, then fixability will deteriorate.

Depending upon the blend ratio and the peak molecular weight of the high molecular weight resin to be blended, the molecular weight distribution curve of the toner resin composition of this invention can have a peak in both the low molecular weight region and the high molecular weight region, or a total of 3 peaks, including a peak from the blended high molecular weight resin.

The offset temperature required of the toner can be adjusted by changing the blend ratio of the high molecular weight resin to be blended.

The particle size of the high molecular weight component resin to be blended is preferably about 3–1,000 micrometers. A more preferable range is from about 50 to 200 micrometers for more uniform dispersion in the resin comprising the low molecular weight component and the high molecular weight component.

For the resin comprising the low molecular weight component and the high molecular weight component as well as the high molecular weight component resin to be blended used in this invention, polymer components which are compatible with each other are used for better performance of the toner.

For example, polymers of styrene-type monomers, polymers of (meth)acrylic ester monomers and copolymers of styrene-type monomers and (meth)acrylic ester monomers are preferably used.

When using copolymers of styrene-type monomers and (meth)acrylic ester monomers, it is preferable to use copolymers with a styrene-monomer component content of about 50–95 wt % and a (meth)acrylic ester monomer component content of about 5–50 wt %. If the styrene-monomer component content is less than about 50 wt %, then the crushability of the toner deteriorates, and if it is more than about 95 wt %, then the fixability of the toner may deteriorate. If the (meth)acrylic ester monomer component content is less than about 5 wt %, the fixability of the toner deteriorates, and if it is more than about 50 wt %, then the crushability of the toner may deteriorate.

The toner containing the toner resin composition of the present invention is manufactured by mixing into the toner composition described above a coloring agent(s) such as carbon black and, as necessary, a charge control agent, magnetic material, carrier powder, a lubricant, abrasive material and a flowability enhancing agent.

The toner of the present invention may also be manufactured in the following process. That is, the toner of this invention can be manufactured by mixing a coloring agent (s) and other additives, as necessary, into the resin comprising the low molecular weight component and the high molecular weight component, and, along with the coloring agent or after mixing in the coloring agent, mixing into this the high molecular weight resin with a peak molecular weight of about 100,000–4,000,000, or a gel content of about 20% or more.

According to this manufacturing method, the required amount of the high molecular weight resin for mixing-in can be easily added as the anti-offset agent when manufacturing the toner. With conventional manufacturing methods, when some improvement in the offset effect of the toner was desired, it was necessary to go back to the designing stage of the toner resin composition, and thus a significant number of processes was required. However, according to this manufacturing method, the offset properties can be easily improved without adding processes.

EXAMPLES

Examples and comparative examples of this invention are described below:

Example 1

700 g of toluene was put into a 3-liter separatable flask and 250 g of a high molecular weight component with a peak molecular weight of 500,000 (a copolymer comprising 85 wt % styrene and 15 wt % 2-ethylhexyl acrylate) was fed into it and dissolved. After the gas phase was replaced by nitrogen gas, the system was heated to the boiling point of toluene. After the refluxing of toluene had begun, a dissolved mixture of 550 g of styrene, 100 g of n-butyl acrylate, 50 g of methyl methacrylate and 30 g of benzoyl peroxide, as a polymerization starter, was dripped into the system for 2.5 hours with agitation, during which the solution polymerization took place. After the completion of dripping, the system was aged for 3 hours with agitation at the boiling temperature of toluene. The system temperature was then gradually raised to 180° C., while toluene was removed under reduced pressure to obtain a resin. This resin was cooled and crushed to obtain resin A.

250 g of a high molecular weight component resin with a peak molecular weight of 500,000 (a copolymer comprising 85 wt % styrene and 15 wt % 2-ethylhexyl acrylate) was dry-blended into this to obtain toner resin composition B of the present invention.

100 weight parts of resin B, 5 weight parts of carbon black (from Mitsubishi Chemical Industries, Ltd., product name: MA-100), 1 weight part of Spiron Black TRH and 3 weight parts of PP wax (from Sanyo Chemical Industries, Ltd., product name: Viscol 660P) were melt-blended, cooled, coarsely crushed and then finely crushed with a jet-mill to obtain toner powder with an average particle size of approximately 11 micrometers. The toner of this invention was prepared by adding 0.3 weight parts of hydrophobic silica powder (from Aerosil Japan, product name: R-972) to the toner powder thus obtained.

10 g of this toner was put into a 100 ml sample bottle, and let stand for 16 hours in a 50° C. thermostatic bath, followed by measurement of the degree of aggregation using a powder tester (from Hosokawa Micron, Ltd.). No aggregation was observed.

Four weight parts of this toner and 96 weight parts of iron powder carrier with an average particle size of 50–80 micrometers were mixed to prepare a developing agent, and this developing agent was used to obtain copies. The electronic copier used was Ricopy FT-7160 (from Ricoh) with some modifications. Copies were made at various temperatures of the heat-press roller of the electronic copier. Said copies were then rubbed with a typewriter eraser (ER-502R, manufactured by LION) [a rubber eraser with fine abrasive particles in it, called a "sand eraser" in Japan and used for erasing letters typed in ink], and the temperature setting at which the density of the copy images did not change after rubbing was defined as the fixing temperature. As for the fixing temperature of the developing agent using this toner, sufficient fixation was achieved at 140° C.

The offset occurring temperature was defined as the lowest temperature setting at which the offset phenomenon occurs when obtaining copies at various temperature settings of the heat-press roller of the electronic copier. The offset occurring temperature of the developing agent using this toner was 240° C., which was sufficiently high.

A running test of 100,000 copies was conducted in a room with a room temperature of 25° C. and relative humidity of 50%. As a result, stable images were obtained.

Example 2

79 weight parts of resin A prepared in Example 1, 21 weight parts of a high molecular weight component resin with a peak molecular weight of 2,000,000 (a copolymer comprising 80 wt % styrene, 15 wt % 2-ethylhexyl acrylate and 5 wt % methyl methacrylate), 5 weight parts of carbon black (from Mitsubishi Chemical Industries, Ltd., product name: MA-100), 1 weight part of Spiron Black TRH (from Hodogaya Kagaku) and 3 weight parts of PP wax (from Sanyo Chemical Industries, Ltd., product name: Viscol 660P) were melt-kneaded in a roll-mill, cooled, crushed and finely crushed with a jet-mill to obtain a toner powder of this invention with an average particle size of approximately 11 micrometers.

The toner and the developing agent were prepared and tests were conducted in the same manner as in Example 1. No aggregation was observed. As for the fixing temperature, sufficient fixation was achieved at 145° C. The offset occurring temperature was 250° C., which was sufficiently high. A running test of 100,000 copies was conducted and stable images were obtained.

Example 3

700 g of toluene was put into a 3-liter separatable flask and 50 g of a high molecular weight component with a peak molecular weight of 500,000 (a copolymer comprising 85 wt % styrene and 15 wt % 2-ethylhexyl acrylate) was fed into it and dissolved. After the gas phase was replaced by nitrogen gas, this system was heated to the boiling point of toluene. After the refluxing of toluene had begun, a dissolved mixture of 550 g of styrene, 100 g of n-butyl acrylate, 50 g of methyl methacrylate and 30 g of benzoyl peroxide, as a polymerization starter, was dripped into the system for 2.5 hours with agitation, during which the solution polymerization took place. After the completion of dripping, the system was aged for 3 hours with agitation at the boiling temperature of toluene. The system temperature was then gradually raised to 180° C., while toluene was removed under reduced pressure to obtain a resin. This resin was cooled and crushed to obtain resin C.

400 g of a high molecular weight component resin with a peak molecular weight of 500,000 (a copolymer comprising 85 wt % styrene and 15 wt % 2-ethylhexyl acrylate) was melt-blended into this with a melter to obtain toner resin composition D of this invention.

The toner and the developing agent were prepared and tests were conducted in the same manner as in Example 1. No aggregation was observed. As for the fixing temperature, sufficient fixation was achieved at 140° C. The offset occurring temperature was 240° C., which was sufficiently high. A running test of 100,000 copies was conducted. As a result, stable images were obtained.

Example 4

700 g of toluene was put into a 3-liter separatable flask and 250 g of a high molecular weight component with a peak molecular weight of 1,000,000 (a copolymer comprising 85 wt % styrene and 15 wt % 2-ethylhexyl acrylate) was fed into it and dissolved. The rest of the procedure was conducted in the same manner as in Example 1 to obtain resin E.

250 g of a high molecular weight component with a peak molecular weight of 500,000 (a copolymer comprising 85 wt % styrene and 15 wt % 2-ethylhexyl acrylate) was dry-blended into this to obtain toner resin composition F of the present invention.

The toner and the developing agent were prepared and tests were conducted in the same manner as in Example 1. No aggregation was observed. As for the fixing temperature, sufficient fixation was achieved at 140° C. The offset occurring temperature was 240° C., which was sufficiently high. A running test of 100,000 copies was conducted and stable images were obtained.

Example 5

50 g of a high molecular weight component resin with a peak molecular weight of 500,000 (a copolymer comprising 85 wt % styrene and 15 wt % 2-ethylhexyl acrylate) was dry-blended into this to obtain toner resin composition G of this invention.

The toner and the developing agent were prepared and tests were conducted in the same manner as in Example 1. No aggregation was observed. As for the fixing temperature, sufficient fixation was achieved at 135° C. The offset occurring temperature was 230° C., which was sufficiently high. A running test of 100,000 copies was conducted and stable images were obtained.

Example 6

55 weight parts of resin A prepared in Example 1, 45 weight parts of a high molecular weight component resin with a peak molecular weight of 500,000 (a copolymer comprising 85 wt % styrene and 15 wt % 2-ethylhexyl acrylate), 5 weight parts of carbon black (from Mitsubishi Chemical Industries, Ltd., product name: MA-100), 1 weight part of Spiron Black TRH (from Hodogaya Kagaku) and 3 weight parts of PP wax (from Sanyo Chemical Industries, Ltd., product name: Viscol 660P) were melt-kneaded in a roll-mill, cooled, crushed and finely crushed with a jet-mill to obtain a toner powder of this invention with an average particle size of approximately 11 micrometers.

The toner and the developing agent were prepared and tests were conducted in the same manner as in Example 1. No aggregation was observed. As for the fixing temperature, sufficient fixation was achieved at 155° C. The offset occurring temperature was 250° C., which was sufficiently high. A running test of 100,000 copies was conducted and stable images were obtained.

Comparative Example 1

800 g of toluene was put into a 3-liter separatable flask and 500 g of a high molecular weight component with a peak molecular weight of 500,000 (a copolymer comprising 85 wt % styrene and 15 wt % 2-ethylhexyl acrylate) was fed into it and dissolved. After the gas phase was replaced by nitrogen gas, this system was heated to the boiling point of toluene. After the refluxing of toluene had begun, a dissolved mixture of 550 g of styrene, 100 g of n-butyl acrylate, 50 g of methyl methacrylate and 20 g of benzoyl peroxide, as a polymerization starter, was dripped into the system for 2.5 hours with agitation, during which the solution polymerization took place. After the completion of dripping, the system was aged for 3 hours with agitation at the boiling temperature of toluene. The system temperature was then gradually raised to 180° C., while toluene was removed under reduced pressure. The residual concentration of the organic solvent was higher than usual. The resin obtained was cooled and crushed to obtain resin H.

Without further blending a high molecular weight component resin, 100 weight parts of resin H, 5 weight parts of carbon black (from Mitsubishi Chemical Industries, Ltd., product name: MA-100), 1 weight part of Spiron Black TRH and 3 weight parts of PP wax (from Sanyo Chemical Industries, Ltd., product name: Viscol 660P) were melt-blended, cooled, coarsely crushed and then finely crushed with a jet-mill to obtain toner powder with an average particle size of approximately 11 micrometers, in the same manner as in Example 1. Toner was prepared by adding 0.3 weight parts of hydrophobic silica powder (from Aerosil Japan, product name: R-972) to the toner powder thus obtained.

The testing was conducted in the same manner as in Example 1. As a result, aggregation was observed. The offset occurring temperature was 230° C., which was lower than that in Example 1. A running test of 100,000 copies was conducted and stable images were obtained.

Comparative Example 2

300 g of toluene was put into a 3-liter separatable flask. After the gas phase was replaced by nitrogen gas, this system was heated to the boiling point of toluene. After the refluxing of toluene had begun, a dissolved mixture of 550 g of styrene, 100 g of n-butyl acrylate, 50 g of methyl methacrylate and 20 g of benzoyl peroxide, as a polymerization starter, was dripped into the system for 2.5 hours with agitation, during which the solution polymerization took place. After the completion of dripping, the system was aged for 3 hours with agitation at the boiling temperature of toluene. The system temperature was then gradually raised to 180° C., while toluene was removed under reduced pressure to obtain a resin. The resin obtained was cooled and crushed to obtain resin I. Resin I is a resin with only a peak(s) from the low molecular weight component.

59 weight parts of this resin I, 41 weight parts of a high molecular weight component resin with a peak molecular weight of 500,000 (copolymer comprising 85 wt % of styrene and 15 wt % of 2-ethylhexyl acrylate), 5 weight parts of carbon black (from Mitsubishi Chemical Industries, Ltd., product name: MA-100), 1 weight part of Spiron Black TRH (from Hodogaya Kagaku) and 3 weight parts of PP wax (from Sanyo Chemical Industries, Ltd., product name: Viscol 660P) were melt-kneaded in a roll-mill. However, the high molecular weight component resin did not disperse well; i.e. the ingredients were not compatible. Therefore, evaluation testing could not be carried out.

Comparative Example 3

1 g of a partially saponificated product of polyvinyl alcohol, "Gohsenol GH-17" (from Nippon Synthetic Chemical Industry), was put into a 5-liter separatable flask, and dissolved in 1,000 ml of distilled water. A dissolved mixture of 320 g of styrene, 80 g of 2-ethylhexyl acrylate and 0.4 g of benzoyl peroxide, as a polymerization starter, was added to this and suspended and dispersed. After the gas phase was replaced by nitrogen gas, the temperature was raised to 80° C., and maintained at this temperature for 15 hours to carry out the first stage polymerization. The reaction system was then cooled down to 40° C., and a dissolved mixture of 550 g of styrene, 100 g of n-butyl acrylate, 50 g of methyl methacrylate and 20 g of benzoyl peroxide, as a polymerization starter, was fed to it. After 2 hours of agitation at 40° C., a solution prepared by dissolving 4 g of "Gohsenol GH-17" into 1000 ml of distilled water was dripped into said system. The temperature was then raised again to 80° C., and maintained at this temperature for 8 hours. The temperature was then raised further up to 95° C. and maintained at this temperature for 2 hours to complete the second stage polymerization. The system was then cooled and the solid was separated. After repeated dehydration and rinsing, the solid was dried to obtain resin J comprising the high molecular weight component and the low molecular weight component.

Without further blending a high molecular weight component resin, 100 weight parts of resin J, 5 weight parts of carbon black (from Mitsubishi Chemical Industries, Ltd., product name: MA-100), 1 weight part of Spiron Black TRH and 3 weight parts of PP wax (from Sanyo Chemical Industries, Ltd., product name: Viscol 660P) were melt-blended, cooled, coarsely crushed and then finely crushed with a jet-mill to obtain toner powder with an average particle size of approximately 11 micrometers, in the same manner as in Example 1. Toner was prepared by adding 0.3 weight parts of hydrophobic silica powder (from Aerosil Japan, product name: R-972) to the toner powder thus obtained.

The testing was conducted in the same manner as in Example 1. As a result, no aggregation was observed. As for the fixing temperature, sufficient fixation was achieved at 140° C. The offset occurring temperature was 240° C., which was sufficiently high. However, the running test resulted in uneven images and a lower image density after 50,000 copies.

Comparative Example 4

100 weight parts of resin I prepared in Comparative Example 2, 5 weight parts of carbon black (from Mitsubishi Chemical Industries, Ltd., product name: MA-100), 1 weight part of Spiron Black TRH and 3 weight parts of PP wax (from Sanyo Chemical Industries, Ltd., product name: Viscol 660P) were melt-kneaded with a roll-mill. In the same manner as in Example 1, the product was then cooled, coarsely crushed and then finely crushed with a jet-mill to obtain toner powder. Toner was prepared by adding 0.3 weight parts of hydrophobic silica powder (from Aerosil Japan, product name: R-972) to this toner powder.

The testing was conducted in the same manner as in Example 1. As a result, aggregation was observed. As for the fixing temperature, fixation was achieved at 110° C. However, the offset occurring temperature was 240° C., which was very low. Due to overcrushing during the crushing process with the jet-mill, the particles were super fine and image fogging occurred. Therefore, uniform images could not be obtained.

Comparative Example 5

100 weight parts of a high molecular weight component resin with a peak molecular weight of 500,000 (a copolymer comprising 85 wt % styrene and 15 wt % 2-ethylhexyl acrylate), 5 weight parts of carbon black (from Mitsubishi Chemical Industries, Ltd., product name: MA-100), 1 weight part of Spiron Black TRH and 3 weight parts of PP wax (from Sanyo Chemical Industries, Ltd., product name: Viscol 660P) were melt-kneaded with a roll-mill.

In the same manner as in Example 1, the product was then cooled, coarsely crushed and then fine crushing was attempted using a jet-mill. However, fine crushing could not be accomplished and therefore the evaluation testing could not be conducted.

The evaluation results of the Examples and Comparative Examples are shown in Table 1.

TABLE 1

| | Aggregation | Fixing Temperature | Offset Occurring Temperature | Image Quality |
|---|---|---|---|---|
| Example 1 | ○ | 140° C. | 240° C. | ○ |
| Example 2 | ○ | 145° C. | 250° C. | ○ |
| Example 3 | ○ | 140° C. | 240° C. | ○ |
| Example 4 | ○ | 140° C. | 240° C. | ○ |
| Example 5 | ○ | 135° C. | 230° C. | ○ |
| Example 6 | ○ | 155° C. | 250° C. | ○ |
| Comparative Example 1 | Δ | 140° C. | 230° C. | ○ |
| Comparative Example 2 | Evaluation was not possible. | | | |
| Comparative Example 3 | ○ | 140° C. | 240° C. | Δ |
| Comparative Example 4 | X | 110° C. | 110° C. | X |
| Comparative Example 5 | Evaluation was not possible. | | | |

The toner resin composition and the toner using this are superior toner resin composition and the toner which has improved anti-offset properties and superior anti-blocking properties and fixability, provides stable images, and can be provided by a simple manufacturing method.

Particularly, since the amount of the high molecular weight resin to be blended into the resin composition of this invention can be freely adjusted when manufacturing the toner resin composition, the offset effect of the toner can be easily improved by simply adding the required amount of the high molecular weight resin as an anti-offset agent.

According to the manufacturing method of the present invention, a required amount of the high molecular weight resin for mixing-in can be easily added as the anti-offset agent when manufacturing the toner. With conventional manufacturing methods, when some improvement in the offset effect of the toner was desired, it was necessary to go back to the designing stage of the toner resin composition, and thus a significant number of processes were required. However, according to this manufacturing method, the offset properties can easily be improved without adding processes.

What is claimed is:

1. A toner resin composition comprising a dry-blended or melt-blended mixture of resins selected from the group consisting of polystyrene and copolymers comprising styrene units and (meth)acrylic ester units, said mixture comprising a first resin of a high molecular weight resin having a peak molecular weight of about 100,000–4,000,000, or a gel content of about 20% or more, and a second resin comprising a homogeneous single-phase polymer mixture of at least a low molecular weight component having a peak molecular weight of about 3,000–50,000, said low molecular weight component making up about 60–95 wt % of the second resin and a high molecular weight component having a peak molecular weight of about 100,000–4,000,000, making up about 5–40 wt % of the second resin.

2. A method of manufacturing a toner resin composition comprising polymerizing monomers selected from the group consisting of styrene monomers, (meth)acrylic ester monomers, and mixtures of styrene monomers and (meth) acrylic ester monomers to produce a low molecular weight polymer having a peak molecular weight of about 3,000–50,000, making up about 60–95 wt % of a polydisperse resin, and mixing therewith to form a homogeneous single-phase polymer a high molecular weight polymer selected from the group consisting of polystyrene, copolymers comprising styrene units and (meth)acrylic ester units, and mixtures thereof, and having a peak molecular weight of about 100,000–4,000,000, making up about 5–40 wt % of the polydisperse resin, and then dry blending or melt blending the polydisperse resin with a resin of a high molecular weight polymer selected from the group consisting of polystyrene and copolymers comprising styrene units and (meth) acrylic ester units, and mixtures thereof, having a peak molecular weight of about 100,000–4,000,000, or a gel content of about 20% or more.

* * * * *